(12) United States Patent
Roger et al.

(10) Patent No.: US 8,893,637 B2
(45) Date of Patent: Nov. 25, 2014

(54) UNDERWATER FLOATING DEVICE

(71) Applicant: Sercel, Carquefou (FR)

(72) Inventors: Thierry Roger, Nantes (FR);
Jean-Jacques Vignaux, Carquefou (FR);
Christophe Augor, Plouzane (FR)

(73) Assignee: SERCEL, Carquefou (FR)

( * ) Notice: Subject to any disclaimer, the term of this patent is extended or adjusted under 35 U.S.C. 154(b) by 110 days.

(21) Appl. No.: 13/684,434

(22) Filed: Nov. 23, 2012

(65) Prior Publication Data

US 2013/0137321 A1     May 30, 2013

(30) Foreign Application Priority Data

Nov. 25, 2011   (EP) .................................. 11306558

(51) Int. Cl.
| | | |
|---|---|---|
| *B63G 8/14* | (2006.01) | |
| *G01V 1/38* | (2006.01) | |
| *B63B 21/66* | (2006.01) | |
| *B63G 8/42* | (2006.01) | |

(52) U.S. Cl.
CPC .............. *G01V 1/3817* (2013.01); *B63B 21/66* (2013.01); *B63G 8/42* (2013.01); *B63B 2231/50* (2013.01)
USPC ............................ 114/245; 114/274; 441/133

(58) Field of Classification Search
USPC ........... 441/133; 405/171; 138/133; 114/242, 114/244, 245, 271, 274
See application file for complete search history.

(56) References Cited

U.S. PATENT DOCUMENTS

| | | | | |
|---|---|---|---|---|
| 4,706,711 | A | * | 11/1987 | Czvikovszky et al. ........ 405/171 |
| 4,764,137 | A | * | 8/1988 | Schulte .......................... 441/133 |
| 5,722,794 | A | * | 3/1998 | Friederich et al. ............ 405/171 |
| 6,516,736 | B1 | | 2/2003 | Lancker |
| 2008/0146102 | A1 | | 6/2008 | Cheung |
| 2010/0037402 | A1 | | 2/2010 | Koo et al. |

FOREIGN PATENT DOCUMENTS

| | | |
|---|---|---|
| DE | 3438518 | 4/1986 |
| FR | 2800348 | 5/2001 |
| WO | WO 2006/061687 | 6/2006 |

\* cited by examiner

*Primary Examiner* — Lars A Olson
(74) *Attorney, Agent, or Firm* — Hamre, Schumann, Mueller & Larson, P.C.

(57) ABSTRACT

The present invention relates to an underwater floating device (1) characterized in that it comprises:
- an insert (4) comprising a thermoplastic material and a hollow tube (7),
- a foam (5) of a thermoplastic material, at least partly covering the insert (4),
- an outer skin (6) comprising a thermoplastic material formed by injection molding over the foam and configured for being in contact with water during use.

13 Claims, 3 Drawing Sheets

UNDERWATER FLOATING DEVICE

1. TECHNICAL FIELD

The present invention relates to floating devices, in particular submarine or underwater floating devices. Such floating devices may be used in a marine environment, for example in the field of the acquisition of seismic data, oil or gas prospecting industry, marine research or offshore production.

Such floating devices may consist in wings present in a navigation control device, also called <<bird>>, for controlling the position of an instrumented cable towed in water, such as a marine seismic streamer, and/or the relative position of cables in a towed instrumented cable network of streamers.

2. DISCUSSION OF THE BACKGROUND

Underwater floating devices are supposed to, simultaneously, float, be able to resist to high pressures due to the depth at which they are used and be able to resist mechanical loads.

Consequently, such devices must have an efficient density and an efficient mechanical structure in order to withstand pressure and mechanical loads during use.

The floating devices are also supposed to be watertight. In case of damage, they should not be filled entirely with water.

Techniques of seismic data acquisition usually require to tow streamers at depths comprised between 5 meters and 15 meters.

New techniques of seismic data acquisition require now to tow streamers at depths that can reach 80 to 120 meters. Thus, during operations, the floating devices are therefore supposed to resist to pressures possibly reaching 1.2 MPa, i.e. until 12 bars.

It is known to make a floating device with a foam core of PVC (Polyvinyl chloride) covered with a skin of polyurethane low pressure. The foam is machined, which is expensive. The skin is in a thermosetting material, which is not recyclable.

Another device of this type is disclosed in US 2010/037402, which device comprises a hollow skeleton and a seal. This device has the drawback of being hollow, so that in case of damage, it will get full of water, and would not thus be able to float anymore. Another drawback of this known device is that it comprises a lot of fiberglass which create deformations of the panels which makes it difficult to assemble.

Another known floating device comprises an epoxy resin foam and a skin made of an epoxy resin or a polyurethane. Such thermosetting device is not recyclable, is expensive and fragile in case of collision. Furthermore, the epoxy resin foam comprises open cells which fill up with water in case of damage of the device.

Another known device comprises a foam of polyurethane which forms a skin when in contact with water. Such device is not recyclable and is expensive.

3. OBJECTIVES OF THE INVENTION

The invention aims at providing a floating device which remedies to the deficiencies of known devices.

In particular, an objective of the invention is to provide a floating device having density and floating properties enabling it to be used under water when pressure reaches high pressures such as pressures comprised between 0.8 to 1.2 MPa.

Another objective of the invention is to provide a floating device that is not expensive, that is environment-friendly by being recyclable.

Another objective of the invention is to provide a floating device that does not fill up with water in case of damage, for example when a collision occurs.

4. SUMMARY OF THE INVENTION

The invention satisfies all or part of these objectives with an underwater floating device, the underwater floating device comprising:
  an insert comprising a thermoplastic material and a hollow tube,
  a foam of a thermoplastic material, at least partly covering the insert,
  an outer skin comprising a thermoplastic material formed by injection molding over the foam and configured for being in contact with water during use.

Thanks to the invention, the underwater floating device has the required technical features, being simultaneously watertight, thanks to the outer skin, floating and light thanks to the foam, and pressure resistant thanks to the combination of the components forming the underwater floating device. Furthermore, the underwater floating device can be recycled and is not expensive to produce, thanks to the thermoplastic material forming the different components of the device.

For making the invention, the inventors have gone beyond presumption that it was not possible to work with thermoplastic materials in such application, and in particular to use several thermoplastic components.

For thermoplastic materials indeed, the thickness of the material has to be low and constant, during manufacturing. The reason is that the greater the thickness is, the more important the phenomena of shrinkage of the material are, which is not the case of thermosetting material.

The inventors thus found that the presence of an insert enables the use of a thermoplastic material.

The shape of the insert helps compensate for places where the thickness of the foam is too low, therefore rigidifies the underwater floating device.

Variations of thickness of the skin may also help compensate for places where there is a too low thickness of the foam.

Furthermore, the inventors have gone beyond another presumption that it is not possible to arrange a foam of a thermoplastic material such as the skin on another thermoplastic material such as the foam. The reason is that the temperature and pressure of injection of the skin have to be high so that there is a risk of melting the foam during injection of the skin and a risk of compressing the foam in its totality. Such risks are not encountered by thermosetting material.

The foam of the underwater floating device has advantageously an elastic limit in compression equal to about 1.2 MPa. Therefore, the underwater floating device does not lose its shape under 12 bars pressure of the marine environment.

Thanks to the fact that the cover is molded by injection over the foam, it is not necessary to add stoppers. Furthermore, more complex shapes such as edges or small thicknesses of foam may be obtained. Moreover, residual bubbles may be eliminated in the foam.

The thermoplastic material of the insert, of the foam and of the skin may be based on a unique thermoplastic material, for example polypropylene.

An advantage of such material is that it can be easily found on the market.

This feature helps recycling the underwater floating device, as there is a unique material constituting the three components or layers of the underwater floating device.

The device may have a global density in the range 50 kg/m³ to 750 kg/m³, for example in the range 150 kg/m³ to 500 kg/m³, for example equal to about 250 kg/m³.

Such a feature improves the buoyancy of the device.

The insert and/or the foam and/or the skin may be shaped by injection moulding. This may facilitate the manufacturing of the underwater floating device.

The foam may have a density in the range 30 to 700 kg/m³, for example in the range 100 to 500 kg/m³, for example equal to about 200 kg/m³. Such a density improves the buoyancy, the foam being relatively light.

In a particular embodiment, the insert comprises fiberglass in a proportion between 0% to 60%, for example between 5% and 40%. Fiberglass enables to reinforce the structure of the insert. The presence of fiberglass requires to separate fiberglass from the rest of the device before recycling.

The insert and the foam may stick to each other. The foam and the skin may stick to each other. Such adhesion between two or three layers may be obtained without adding any adhesive, due in particular to the fact that the different components or layers of the underwater floating device are made of a thermoplastic material. The adhesion between at least two layers of the underwater floating device reinforce the global structure of the underwater floating device, eliminating any clearance between the concerned components. Furthermore, in case of damage of the outer skin, the adhesion between the layers prevents water from seeping into the underwater floating device.

The foam may comprise closed cells. The fact that the foam comprises closed cells advantageously limits the quantity of water that could saturate the foam in case of damage of the outer skin of the underwater floating device.

In a preferred embodiment, the skin is watertight.

The underwater floating device may be chosen in the group consisting of:
  a wing of a navigation control device, also called <<bird>>,
  a wing of an autonomous underwater vehicle,
  a wing of a glider.

Another object of the invention relates to a navigation control device comprising an underwater floating device as described above.

5. BRIEF DESCRIPTION OF THE DRAWINGS

The accompanying drawings, which are incorporated in and constitute a part of the specification, illustrate one or more embodiments and, together with the description, explain these embodiments. In the drawings.

6. DETAILED DESCRIPTION OF AN EXEMPLARY EMBODIMENT

The underwater floating device according to the invention may be a wing of a navigation control device, also called <<bird>>, a wing of an autonomous underwater vehicle or a wing of a glider or any other suitable marine device.

Figure 1:
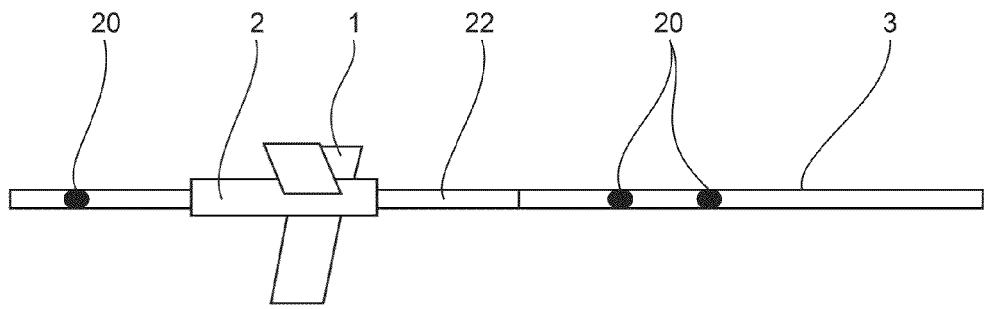
FIG. 1 is a schematic representation of part of a seismic streamer including a navigation control device comprising an underwater floating device according to the invention.

In the exemplary embodiment shown in the figures, the underwater floating device 1 is a wing of a navigation control device 2, or <<bird>>, as can be seen in FIG. 1. Such navigation control device 2 comprises three wings in this example and is part of a seismic streamer 3. The seismic streamer 3 is partly shown in FIG. 1 and comprises a plurality of sensors 20, also called hydrophones, and transducers 22, among which one is shown in FIG. 1.

Figure 2:
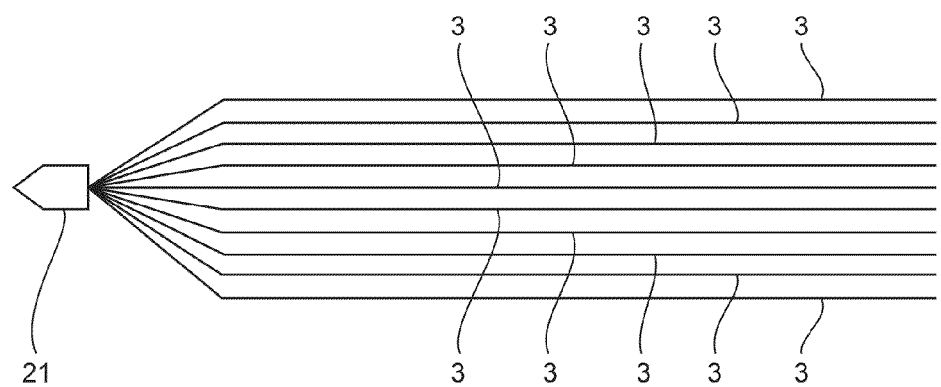
FIG. 2 is a schematic representation of a network of streamers towed by a vessel, including several navigation control devices as the one of FIG. 1.

The seismic streamer 3 is part of a network of seismic streamers, shown in FIG. 2, that is towed by a vessel 21, on which is located a centralized system (not shown) comprising a navigation system and a node manager system.

In the exemplary embodiment, the role of the navigation control device 2 is the acoustic positioning of seismic streamers and sources and the control of seismic streamers. It includes three sub-systems:
  a streamer depth and steering controller,
  acoustic transceivers, and
  an advanced redundant telemetry sub-system.

The streamers network is suitable for being towed at a level under the sea-level of about 100 meters, so that the mechanical loads and water pressure are considerable.

The underwater floating device 1, according to the invention, comprises three components or layers:
  an insert comprising a thermoplastic material and a hollow tube,
  a foam of a thermoplastic material, at least partly covering the insert,
  an outer skin comprising a thermoplastic material formed by injection molding over the foam and configured for being in contact with water during use.

For making the invention, the inventors have gone beyond presumption that it was not possible to work with thermoplastic materials in such application, and in particular to use several thermoplastic components.

For thermoplastic materials indeed, the thickness of the material has to be low and constant, during manufacturing. The reason is that the greater the thickness is, the more important the phenomena of shrinkage of the material are, which is not the case of thermosetting material.

The inventors thus found that the presence of an insert enables the use of a thermoplastic material.

The shape of the insert helps compensate for places where the thickness of the foam is too low, therefore rigidifies the underwater floating device.

Variations of thickness of the skin may also help compensate for places where there is a too low thickness of the foam.

The global density of the underwater floating device 1 itself is between 50 to 750 kg/m³, in this example equal to about 250 kg/m³.

Figure 3:
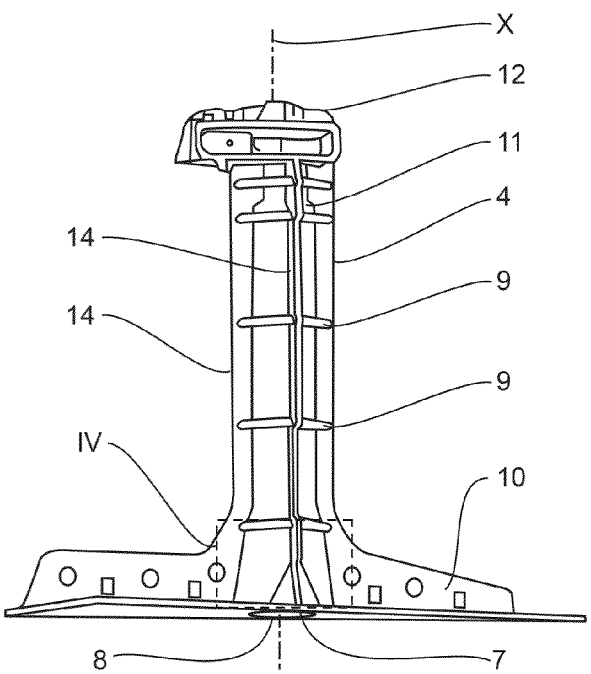
FIG. 3 is a schematic representation in perspective of an example of an insert, part of the underwater floating device according to the invention.

The insert 4 is shown aside in FIG. 3. In this example, the insert 4 is made by injection of a thermoplastic material consisting of polypropylene in the embodiment. It comprises a small proportion of fiberglass so as to reinforce its structure. The insert 4 comprises a hollow tube 7 extending according to a longitudinal axis X, opened at one open end 8, and having a circular cross-section. The hollow tube 7 allows the fastening of the wing to the navigation control device 2 in this example. The hollow tube 7 has another closed end 11 topped by an upper end 12 of the insert 4, whose width is greater than the diameter of the hollow tube 7.

Figure 4:
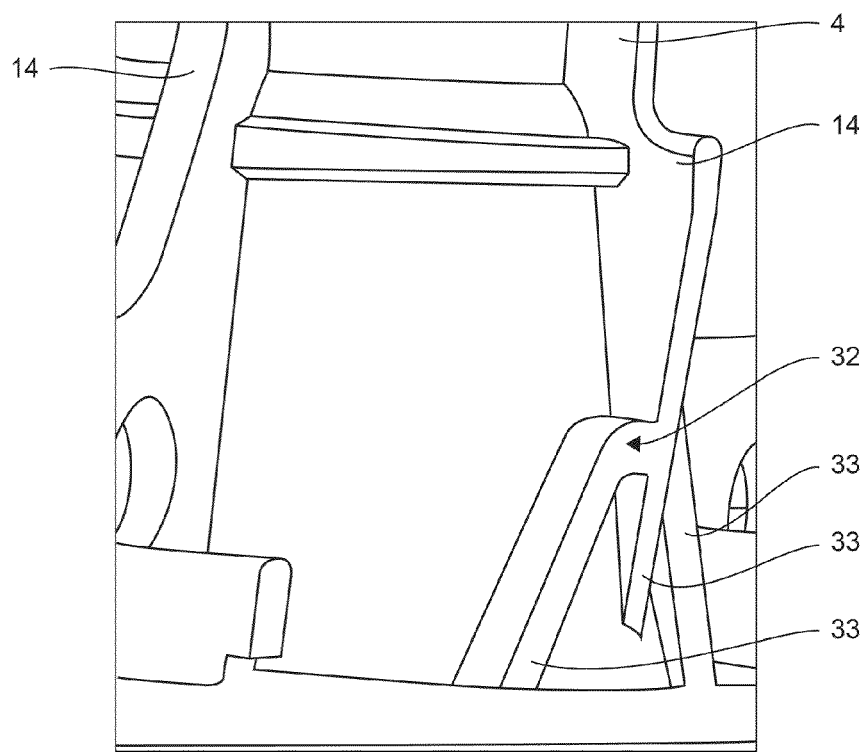
FIG. 4 is a schematic enlarged representation of part IV of the insert of FIG. 3.

The insert 4 also comprises a base 10 extending around the open end 8, perpendicularly to the axis X of the hollow tube, in a non-symmetrical manner. The insert 4 comprises first external ribs 9 that are substantially perpendicular to axis X and second external ribs 14 that are substantially parallel to axis X and connect the upper end 12 and the base 10. An enlarged representation of part of the base 10 of the insert 4 is shown in FIG. 4. In this Figure, an end 32 of one of second external ribs 14 is shown, forming a kind of fork with three prongs 33. The general shape of the insert, with in particular first external ribs 9, second external ribs 14, end 32 with prongs 33, shape of base 10, is chosen so as to provide a rigid wing, even when the thickness of the foam 5 is about equal to 5 mm.

The shape of the insert may be different without departing from the scope of the invention.

Figure 5:
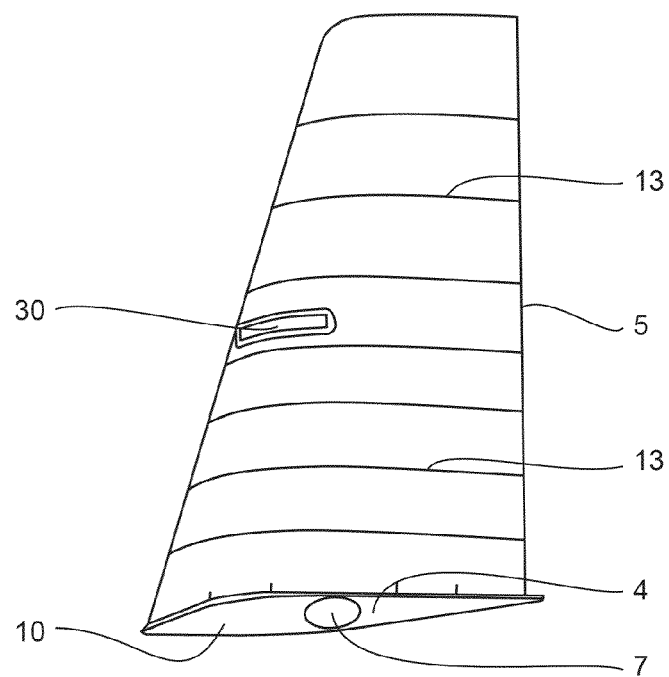
FIG. 5 is a schematic representation in perspective of an example of a foam, part of the underwater floating device according to the invention.

The foam 5, shown in FIG. 5, comprises a polypropylene foam with closed cells. Foam 5 has a density of about 200 kg/m³. The foam 5 is moulded by injection over the insert 4, in such a manner as to have everywhere a thickness equal or greater than 5 mm. The base 10 and the open end 8 of the hollow tube 7 are visible in FIG. 3, as these parts of the insert 4 are not covered by the foam 5.

The foam 5 of the underwater floating device has in the embodiment an elastic limit in compression equal to about 1.2 MPa.

The shape of foam 5 is similar to the end global shape of the underwater floating device and forms a wing. The external shape of the foam 5 or of the underwater floating device 1 may be different without departing from the scope of the invention.

In this example, the foam 5 and the insert 4 stick to each other, without any adhesive. The lines 13 are in the example marks of the injection.

An opening 30 is represented in FIG. 5. Such opening 30 is foreseen so as to allow the fastening of the underwater floating device 1 to an arm of a body of the navigation control device 2.

Figure 6:
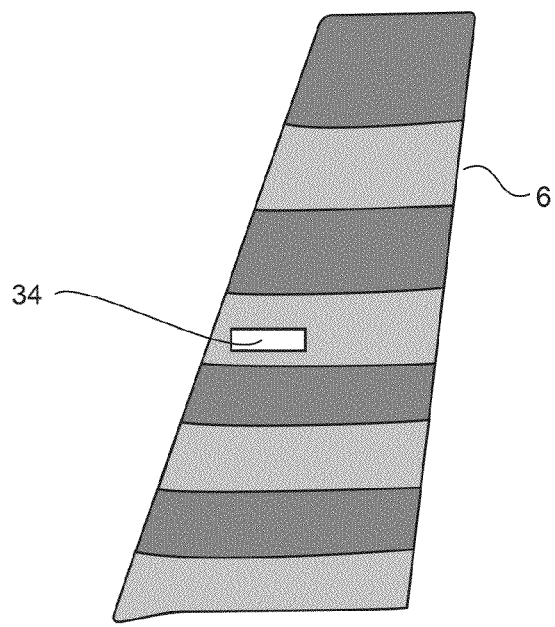
FIG. 6 is a schematic representation in perspective of an example of an outer skin, part of the underwater floating device according to the invention.

The outer skin 6 is moulded by injection over the foam 5. This outer skin is shown in FIG. 6. The outer skin 6 is made in polypropylene. It entirely covers foam 5 and is watertight. The outer skin 6 and the foam 5 stick to each other, without help of an adhesive.

Such adhesion between two or three layers may be obtained without adding any adhesive, due in particular to the fact that the different components or layers of the underwater floating device are made of a thermoplastic material. The adhesion between at least two layers of the underwater floating device reinforce the global structure of the underwater floating device, eliminating any clearance between the concerned components. Furthermore, in case of damage of the outer skin, the adhesion between the layers prevents water from seeping into the underwater floating device.

The stripes of two different colors visible in FIG. 6 are limited by the lines 13 of the foam 5 and are made during the injection process. They have no technical function in the invention but a visual effect.

The opening 30 is covered by outer skin 6, as shown in FIG. 6 on the rectangular place 34.

The method for making the underwater floating device is the following. A mould for the insert is filled by injection with polypropylene, optionally comprising fiberglass. The insert 4 is then covered in another mould, by injection, with the foam 5 which is itself covered by injection with the outer skin 6.

In this process, the temperature and pressure of injection of the skin have to be high so that there is a risk of melting the foam during injection of the skin and a risk of compressing the foam in its totality. Such risks are not encountered by thermosetting material.

The injection of a thermoplastic material on the foam is therefore optimized in order to center the foam in the mould, obviate the fusion of the foam, minimize the injection pressures so as to reduce deformations and limit the geometrical deformations linked to shrinkage. This injection may be realized in one or several steps due to the constraints of the device according to the invention.

In the disclosed embodiment, the underwater floating device is a wing of a navigation control device but it may be another submarine device without departing from the scope of the invention.

The patentable scope of the subject matter is defined by the claims, and may include other examples that occur to those skilled in the art. Such other examples are intended to be within the scope of the claims.

The expression <<comprising a>> should be interpreted as being synonymous of the expression <<comprising at least one>>, unless the contrary is specified.

The ranges should be interpreted as including the limits, unless the contrary is specified.

The invention claimed is:

1. An underwater floating device comprises:
   an insert comprising a thermoplastic material and a hollow tube,
   a foam of a thermoplastic material, at least partly covering the insert,
   an outer skin comprising a thermoplastic material formed by injection molding over the foam and configured for being in contact with water during use; and
   said device being chosen in the group consisting of:
   a wing of a navigation control device,
   a wing of an autonomous underwater vehicle, and
   a wing of a glider.

2. Underwater floating device according to claim 1, wherein the thermoplastic material of the insert, of the foam and of the skin is based on a unique thermoplastic material.

3. Underwater floating device according to claim 2, wherein said thermoplastic material is polypropylene.

4. Underwater floating device according to claim 1, wherein the device has a global density in the range of 50 kg/m³ to 250 kg/m³.

5. Underwater floating device according to claim 1, wherein the insert and/or the foam and/or the skin are shaped by injection molding.

6. Underwater floating device according to claim 1, wherein the foam has a density in the range 50 to 700 kg/m³.

7. Underwater floating device according to claim 1, wherein the insert comprises fiberglass in a proportion in the range of 0% to 60%.

8. Underwater floating device according to claim 1, wherein the insert and the foam stick to each other.

9. Underwater floating device according to claim 1, wherein the foam and the skin stick to each other.

10. Underwater floating device according to claim 1, wherein the foam comprises closed cells.

11. Underwater floating device according to claim 1, wherein the skin is watertight.

12. Underwater floating device according to claim 1, wherein an elastic limit in compression of the foam is equal to about 1.2 MPa.

13. A navigation control device comprising at least one underwater floating device according to claim 1.

* * * * *